United States Patent
Zhuang et al.

(10) Patent No.: US 12,436,769 B2
(45) Date of Patent: Oct. 7, 2025

(54) COMPUTATIONAL GRAPH COMPILING AND SCHEDULING METHODS AND RELATED PRODUCTS

(71) Applicant: Cambricon SingGo (Nanjing) Technology Co., Ltd., Jiangsu (CN)

(72) Inventors: Yimin Zhuang, Jiangsu (CN); Xiaobing Chen, Jiangsu (CN)

(73) Assignee: CAMBRICON SINGGO (NANJING) TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/706,187

(22) PCT Filed: Jun. 22, 2022

(86) PCT No.: PCT/CN2022/100305
§ 371 (c)(1),
(2) Date: Apr. 30, 2024

(87) PCT Pub. No.: WO2023/071238
PCT Pub. Date: May 4, 2023

(65) Prior Publication Data
US 2024/0419449 A1 Dec. 19, 2024

(30) Foreign Application Priority Data
Nov. 1, 2021 (CN) .......................... 202111291728.0

(51) Int. Cl.
*G06F 9/38* (2018.01)
*G06F 9/48* (2006.01)

(52) U.S. Cl.
CPC .......... *G06F 9/3836* (2013.01); *G06F 9/4881* (2013.01)

(58) Field of Classification Search
CPC ............................ G06F 9/3836; G06F 9/4881
See application file for complete search history.

(56) References Cited

U.S. PATENT DOCUMENTS

| 11,195,080 B1* | 12/2021 | Nama | G06N 3/04 |
| 2007/0089097 A1* | 4/2007 | Hu | G06F 8/443 |
| | | | 717/132 |

(Continued)

FOREIGN PATENT DOCUMENTS

| CN | 110321999 A | 10/2019 |
| CN | 111246262 A | 6/2020 |
| CN | 114035916 A | 2/2022 |

OTHER PUBLICATIONS

International Search Report for PCT/CN2022/100305 mailed on Sep. 2, 2022.

*Primary Examiner* — William B Partridge
(74) *Attorney, Agent, or Firm* — The PL Law Group, PLLC

(57) ABSTRACT

The present disclosure discloses computing graph compiling and scheduling methods and related products. An accelerator configured to schedule a computing graph is implemented as a computing apparatus and included in a combined processing apparatus. The combined processing apparatus further includes an interface apparatus and other processing apparatus. The computing apparatus interacts with other processing apparatus to jointly complete a computing operation specified by a user. The combined processing apparatus further includes a storage apparatus. The storage apparatus is connected to the computing apparatus and other processing apparatus respectively and is configured to store data of the computing apparatus and other processing apparatus. By decoupling dynamic information and scheduling from each other, this disclosed scheme facilitates the implementation of pipeline processing, thus improving processing efficiency of a machine.

20 Claims, 9 Drawing Sheets

(56) References Cited

U.S. PATENT DOCUMENTS

2015/0268992 A1 9/2015 Fan
2020/0183738 A1* 6/2020 Champigny .......... G06F 9/5016

* cited by examiner

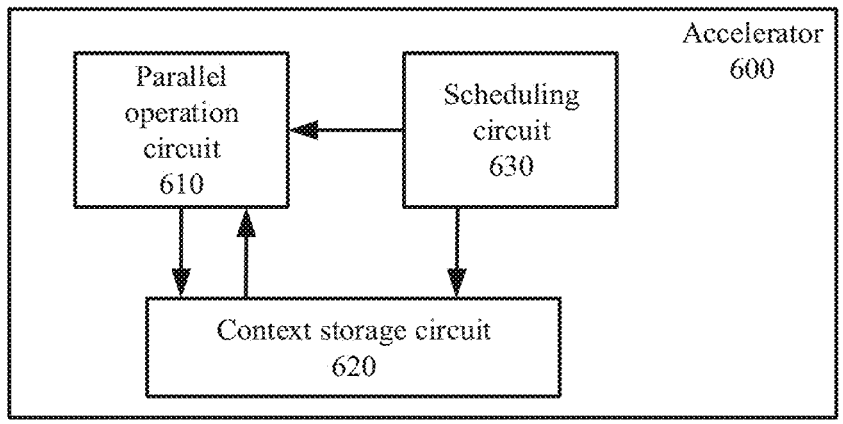

FIG. 6

Split each node in a computing graph into several execution blocks to generate a compiled computing graph, where each execution block represents a child operation of a corresponding node — 710

Split each node into several execution blocks according to whether a hardware unit involved is able to be executed in parallel — 711

Divide adjacent codes executed in the same hardware unit into the same execution block — 712

FIG. 7

```
1  for (int idx = 0; idx < LoopSize; idx++) {
2                                           ┌─► 810: L execution block
3    if (idx == 0) {
4      LoadV.Onchip.Dram(bias, bias_ddr);
5      LoadV.Onchip.Dram(weight, weight_ddr);
6    }
7    LoadV.Onchip.Dram(in, in_ddr);
8                                           ┌─► 820: C execution block
9    Conv(out, in, weight, bias, kernel...);
10   AddV(out, bias);
11   Active(out, out);
12                                          ┌─► 830: S execution block
13   StoreV.Dram.Onchip(out_ddr, out);
14 }
```

FIG. 8

```
1  for (int idx = 0; idx < LoopSize; idx++) {
2     // save contexts and PC of LoadFunction
3     // into context buffer
4     // save DRAM address
5     SaveContext(CB, &in_ddr, &bias_ddr,
6                 &weight_ddr);
7     // save on-chip address
8     SaveContext(CB, &in, &bias, &weight...);
9     SaveContext(CB, in_size, bias_size,
10                weight_size...);
11    SavePC(CB, &LoadFunction);
12
13    ...
14 }
```

FIG. 9

```
1  void IO LoadFunction(void* CB) {
2      // read param from context_buffer
3      Load.Reg.Onchip(dst, &CB);
4      Load.Reg.Onchip(src, &(CB + 4));
5      Load.Reg.Onchip(size, &(CB + 8));
6
7      LoadV.Onchip.Dram(dst, src, size);
8  }
```

Block name → (line 1: IO)
Parameter from CB → (line 1: void* CB)
Behavior of execution block → (lines 3–7)

FIG. 10

Store information about an execution block that is required to be executed in a compiled computing graph in response to the preparatory execution of the execution block in the compiled computing graph when the compiled computing graph is run, so as to construct a runtime computing graph — 1110

Schedule the stored execution block based on the deterministic runtime computing graph according to dependencies, so as to implement pipeline operations — 1120

FIG. 11

Compile time

Run time

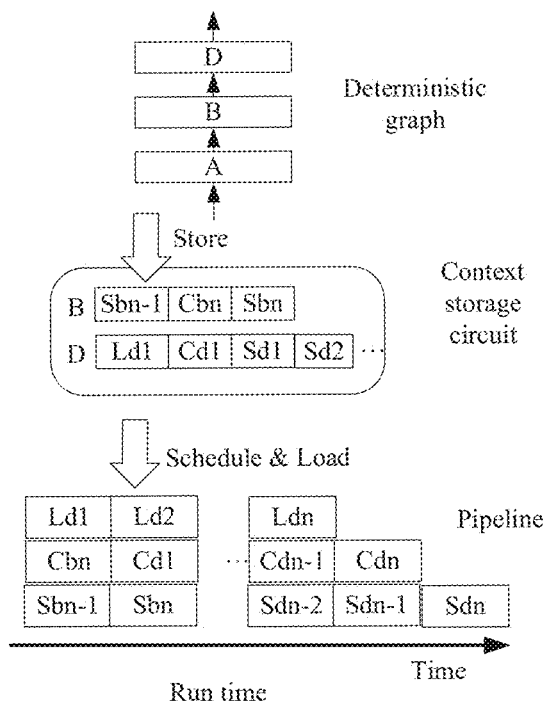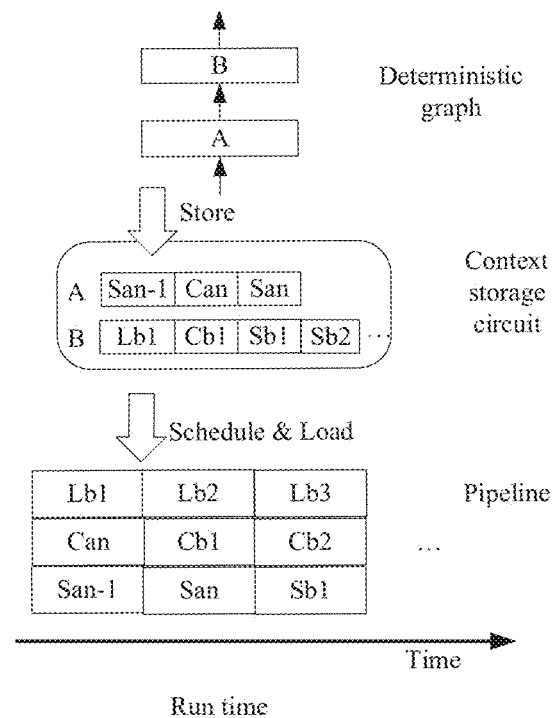
FIG. 12D                                   FIG. 12C

COMPUTATIONAL GRAPH COMPILING AND SCHEDULING METHODS AND RELATED PRODUCTS

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/CN2022/100305, filed Jun. 22, 2022, which claims priority to the benefit of Chinese Patent Application No. 202111291728.0 filed on Nov. 1, 2021, in the China Intellectual Property Office, the entire contents of which are incorporated herein by reference.

BACKGROUND

1. Technical Field

The present disclosure generally relates to the field of data processing. More specifically, the present disclosure relates to computing graph compiling and runtime scheduling methods, a compiler, an accelerator, a chip, and a board card.

2. Background Art

DNN (Deep Neural Network) shows great power in a wide range of applications, including, but not limited to, image processing, natural language processing, and gaming. At the same time, the continuous development of DNN technology also brings new opportunities for architectural innovation in specific domains. A lot of researches on machine learning accelerator architectures and systems are aimed at accelerating the training and reasoning of DNN to obtain better computing power and higher power effect.

Recently, researchers have paid more and more attention on dynamic neural network technology because of its powerful ability to express complex network architectures with a dynamic control flow and a variable data size. As dynamic neural network becomes more and more important in natural language processing and semantic segmentation, frameworks widely used at present also begin to support dynamic neural network technology.

However, the existing optimization work based on neural network accelerators usually focuses on the optimization of static neural networks, and uses a static scheduling method to optimize a static computing graph during compilation. At present, a systemic and complete scheme for efficiently implementing a dynamic neural network on a neural network accelerator has not been found.

SUMMARY

In order to at least partly solve one or a plurality of technical problems mentioned in the background, the present disclosure provides a solution in several aspects. On the one hand, the present disclosure provides an improved accelerator and a computing graph runtime scheduling method, which help to implement efficient pipeline processing. On the other hand, the present disclosure provides a programming interface or compiler and a corresponding compiling method, which make it easy for programmers to perform phase optimization and provide high-level semantics for scheduling optimization.

A first aspect of the present disclosure discloses a computing graph runtime scheduling method, where the computing graph is a compiled computing graph, and the compiled computing graph includes a plurality of execution blocks, where the execution blocks represent child operations of each node in the computing graph, and the method includes:

storing information about an execution block that is required to be executed in the compiled computing graph in response to the preparatory execution of the execution block when the compiled computing graph is run, so as to construct a runtime computing graph; and scheduling the stored execution block based on the runtime computing graph according to dependencies, so as to implement pipeline operations.

A second aspect of the present disclosure discloses a computing graph compiling method, including:

splitting each node in the computing graph into several execution blocks to generate a compiled computing graph, where each execution block represents a child operation of a corresponding node, and the execution blocks are used to construct and schedule a runtime computing graph in units of the execution blocks when the compiled computing graph is run.

A third aspect of the present disclosure discloses an accelerator, including:

a parallel operation circuit configured to perform operations in parallel;

a context storage circuit configured to store information about an execution block that is required to be executed in a compiled computing graph in response to the preparatory execution of the execution block when the compiled computing graph is run, so as to construct a runtime computing graph, where the compiled computing graph includes a plurality of execution blocks, where the execution blocks represent child operations of each node in the computing graph; and a scheduling circuit configured to schedule the stored execution block based on the runtime computing graph according to dependencies to control the parallel operation circuit to implement pipeline operations.

A fourth aspect of the present disclosure provides a compiler, which includes a processing circuit configured to perform the computing graph compiling method of the second aspect of the present disclosure.

A fifth aspect of the present disclosure provides a chip, including the accelerator of the third aspect and/or the compiler of the fourth aspect.

A sixth aspect of the present disclosure provides a board card, including the chip of the fifth aspect.

According to the scheduling scheme provided above, parallel pipeline processing may be implemented in a dynamic neural network, thus achieving significant performance improvement. In addition, the scheduling scheme provided above may also be applied to a static neural network and only negligible overhead is introduced. Therefore, the scheduling scheme of the present disclosure may also be applied to a mixed scenario where a dynamic neural network and a static neural network exist at the same time, thus achieving overall performance improvement.

BRIEF DESCRIPTION OF THE DRAWINGS

By reading the following detailed description with reference to drawings, the above and other objects, features and technical effects of exemplary implementations of the present disclosure will become easier to understand. In the drawings, several implementations of the present disclosure are shown in an exemplary but not restrictive manner, and the same or corresponding reference numerals indicate the same or corresponding parts.

FIG. 6 is a schematic simplified structure block diagram of an accelerator according to an embodiment of the present disclosure.

FIG. 7 is an exemplary flowchart of a computing graph compiling method according to an embodiment of the present disclosure.

FIG. 8 is a computing graph splitting example according to an embodiment of the present disclosure.

FIG. 9 is an exemplary rewriting program according to an embodiment of the present disclosure.

FIG. 10 is an exemplary programming interface according to an embodiment of the present disclosure.

FIG. 11 is an exemplary flowchart of a computing graph runtime scheduling method according to an embodiment of the present disclosure.

FIGS. 12A to 12D are an exemplary execution process of a runtime scheduling scheme according to an embodiment of the present disclosure.

DETAILED DESCRIPTION

Figure 1:
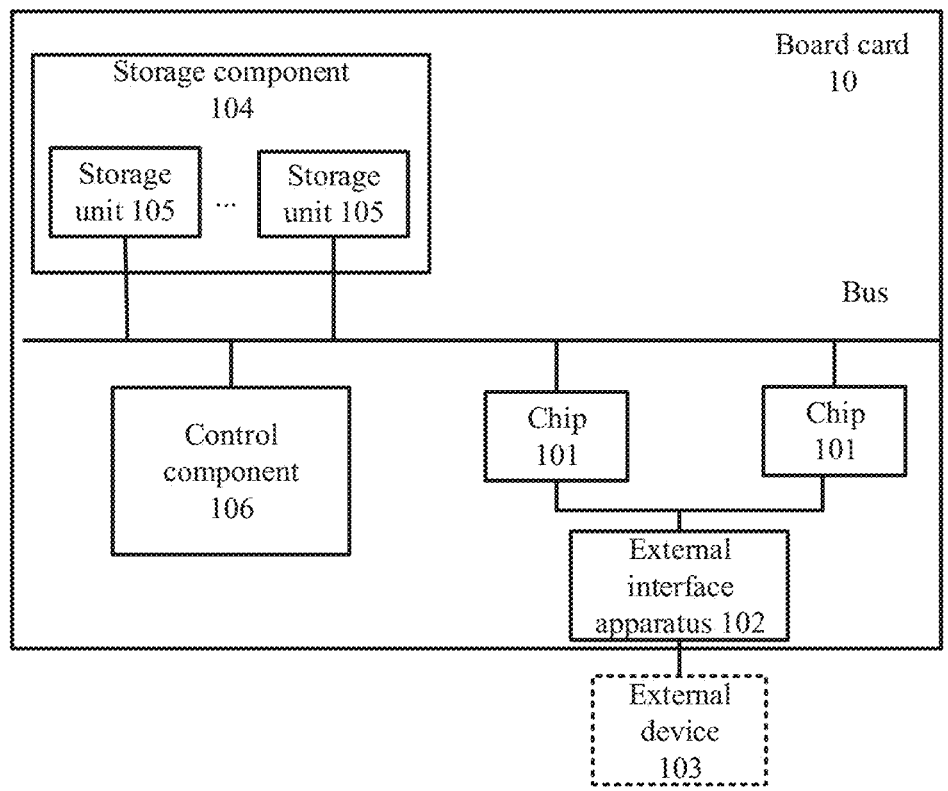
FIG. 1 is a structural diagram of a board card according to an embodiment of the present disclosure.

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" appear in the claims, specification, and drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more of other features, entities, steps, operations, elements, components, and/or collections thereof.

It should also be understood that the terms used in the specification of the present disclosure are merely intended to describe a specific embodiment rather than to limit the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context.

The existing research is focused on optimizing a static neural network with fixed input/output shapes and a static computing graph. For example, Auto TVM (tensor virtual machine) constructs a statistical cost model and designs an exploratory model to search for a best configuration to run a network on hardware. DNNVM (deep neural network virtual machine) designs a cycle-accurate simulator to find a best execution strategy for fusion nodes. These optimizations require knowledge of predefined fixed network architectures and are therefore difficult to be applied to a dynamic neural network.

By analyzing a reasoning process of the dynamic neural network, inventors notice that a dynamic tensor shape and a control flow hinder scheduling optimization to obtain better computing parallelism and hardware utilization. In detail, for a static neural network, its input and output shapes are known in advance, and its network structure is also fixed. Therefore, a compiler for a DNN accelerator may optimize hardware utilization and computing throughput based on analysis on dependencies of a static computing graph and by using software pipeline technology. However, for a dynamic neural network, computing loads of a control flow and a tensor are determined at run time. Therefore, it is extremely risky to make optimal scheduling in advance during static analysis. In addition, for a dynamic neural network, more contexts are required to be recorded, which undoubtedly increases the burden of register resources.

For one or a plurality of technical problems mentioned above, the present disclosure provides a solution in many aspects. A first aspect of the present disclosure provides an improved accelerator, especially an improved DNN accelerator, which helps to implement efficient pipeline processing. A second aspect of the present disclosure provides a programming interface or compiler, which makes it easy for programmers to perform phase optimization and provides high-level semantics for scheduling optimization. A third aspect of the present disclosure provides a scheduling scheme, which efficiently implement dynamic pipeline processing based on an improved accelerator.

Specific implementations of the present disclosure will be described in detail in combination with drawings below.

Neural Network and Computing Graph

The DNN model usually uses a symbolic representation to show a structure of a network computing graph. For example, TensorFlow uses a directed graph containing a set of nodes and edges to describe a computing process, and this directed graph is called a computing graph.

With respect to terms "node" and "operator" mentioned in this disclosure, it should be noted that the term "operator" is used at the computing level of a computer (or at a software or algorithmic level); and the term "node" is a more figurative term (the term "node" is used at a graphical or more intuitive level). In terms of what the terms refer to, the terms "operator" and "node" actually refer to the same thing. In other words, in the present disclosure, the terms "operator" and "node" may be considered as having the same meaning and may be used interchangeably, but are described from different sides.

A static neural network has a fixed network structure and fixed tensor shapes. A definition phase of a computing graph is called a static declaration. The static neural network enables a DNN model to be deployed simply and efficiently. A compiler may optimize a network by using a complex optimization method during compilation. Batch processing technology may be used to improve efficiency of a multi-core processor (such as a GPU (graphics processing unit)). Because of these advantages, the static declaration is a dominant programming paradigm for a DNN compiler.

With the continuous development of natural language processing and semantic segmentation, a dynamic neural network is applied in more and more DNNs. Compared with a static neural network, a dynamic neural network has an unfixed computing graph, which includes a variable size, a variable structure, or a control flow. Dynamic neural network technology supports a variable network structure through a dynamic declaration at run time, thereby enabling an application requiring a complex neural network structure.

Specifically, a dynamic neural network is usually applied in following scenarios: 1) sequence language model. Inputs of these models are sequences that usually have variable lengths. 2) Tree structure RNN (recurrent neural network). For a language model with sentiment analysis, inputs are tree structures, and these tree structures change for different sentences. 3) NAS (neural architecture search). The NAS aims to find an optimal model for a specific task by repeatedly testing performance of different network architectures. During the task, the network architectures continue to evolve.

In some cases, a dynamic neural network may be simplified as a static neural network. For example, for a sequence language model with a variable sentence length, by adding redundant padding, all sentences may be aligned to the longest sentence. However, this will cause a lot of redundant and unnecessary computing.

Exemplary Hardware Environment

DNN accelerator is a domain-specific processor, which is designed to improve computing and energy efficiency of DNN applications. Architectural characteristics of the DNN accelerator are very different from a traditional CPU (central processing unit) or GPU, which greatly affects optimization of a program model and a compiler.

FIG. 1 is a structural diagram of a board card 10 according to an embodiment of the present disclosure. As shown in FIG. 1, the board card 10 includes a chip 101, which is an SoC (system on chip), or called an on-chip system, and integrates one or a plurality of combined processing apparatuses. The combined processing apparatus is an artificial intelligence operation unit, which is configured to support various deep learning algorithms and various machine learning algorithms and meet requirements of intelligent processing in complex scenarios in computer vision, speech, natural language processing, data mining, and other fields. In particular, deep learning technology is widely used in the field of cloud intelligence. A notable feature of cloud intelligence applications is the large amount of input data, which has high requirements for storage capacity and computing power of a platform. The board card 10 of this embodiment is suitable for the cloud intelligent applications and has huge off-chip storage, huge on-chip storage, and great computing power.

The chip 101 is connected to an external device 103 through an external interface apparatus 102. The external device 103 may be, for example, a server, a computer, a camera, a monitor, a mouse, a keyboard, a network card, or a WIFI interface. To-be-processed data may be transferred from the external device 103 to the chip 101 through the external interface apparatus 102. A computing result of the chip 101 may be transferred back to the external device 103 through the external interface apparatus 102. According to different application scenarios, the external interface apparatus 102 may have different interface forms, such as a PCIe (peripheral component interface express) interface, and the like.

The board card 10 further includes a storage component 104 configured to store data. The storage component 104 includes one or a plurality of storage units 105. The storage component 104 is connected to and transfers data to a control component 106 and the chip 101 through a bus. The control component 106 in the board card 10 is configured to regulate and control a state of the chip 101. As such, in an application scenario, the control component 106 may include an MCU (micro controller unit).

Figure 2:
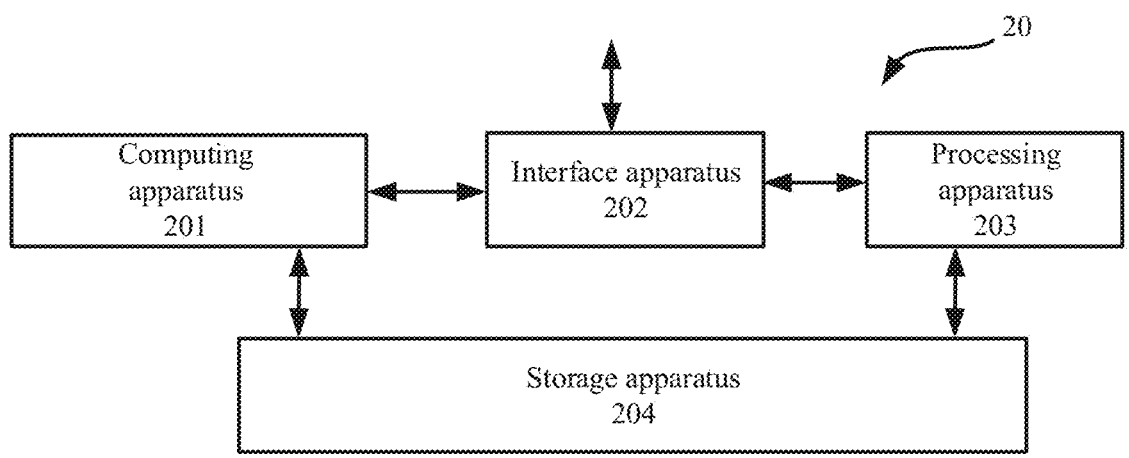
FIG. 2 is a structural diagram of a combined processing apparatus according to an embodiment of the present disclosure.

FIG. 2 is a structural diagram of a combined processing apparatus in the chip 101 of this embodiment. As shown in FIG. 2, a combined processing apparatus 20 includes a computing apparatus 201, an interface apparatus 202, a processing apparatus 203, and a storage apparatus 204.

The computing apparatus 201 is configured to perform an operation specified by a user and is mainly implemented as a single-core intelligent processor or a multi-core intelligent processor. The computing apparatus 201 is configured to perform computing of deep learning or machine learning and interacts with the processing apparatus 203 through the interface apparatus 202 to jointly complete the operation specified by the user.

The interface apparatus 202 is configured to transfer data and control instructions between the computing apparatus 201 and the processing apparatus 203. For example, the computing apparatus 201 may acquire input data from the processing apparatus 203 via the interface apparatus 202 and write the input data to an on-chip storage apparatus of the computing apparatus 201. Further, the computing apparatus 201 may acquire control instructions from the processing apparatus 203 via the interface apparatus 202 and write the control instructions to an on-chip control cache of the computing apparatus 201. Alternatively or optionally, the interface apparatus 202 may further read data in the storage apparatus of the computing apparatus 201 and then transfer the data to the processing apparatus 203.

The processing apparatus 203 serves as a general processing apparatus and performs basic controls, including, but are not limited to, moving data, starting and/or stopping the computing apparatus 201. According to different implementations, the processing apparatus 203 may be a CPU, a GPU, or one or more of other general and/or dedicated processors. These processors include, but are not limited to, a DSP (digital signal processor), an ASIC (application specific integrated circuit), an FPGA (field-programmable gate array), or other programmable logic components, discrete gate or transistor logic components, discrete hardware components, and the like. Moreover, the number of the processors may be determined according to actual requirements. As described above, with respect to the computing apparatus 201 of the present disclosure only, the computing apparatus 201 of the present disclosure may be viewed as having a single-core structure or an isomorphic multi-core structure. However, when considered together, the computing apparatus 201 and the processing apparatus 203 are viewed as forming a heterogeneous multi-core structure.

The storage apparatus 204 is configured to store to-be-processed data. The storage apparatus 204 may be a DRAM (dynamic random access memory), which is a DDR (double data rate) memory with a size of 16G or more than 16G generally. The storage apparatus 204 is configured to save data of the computing apparatus 201 and/or the processing apparatus 203.

Figure 3:
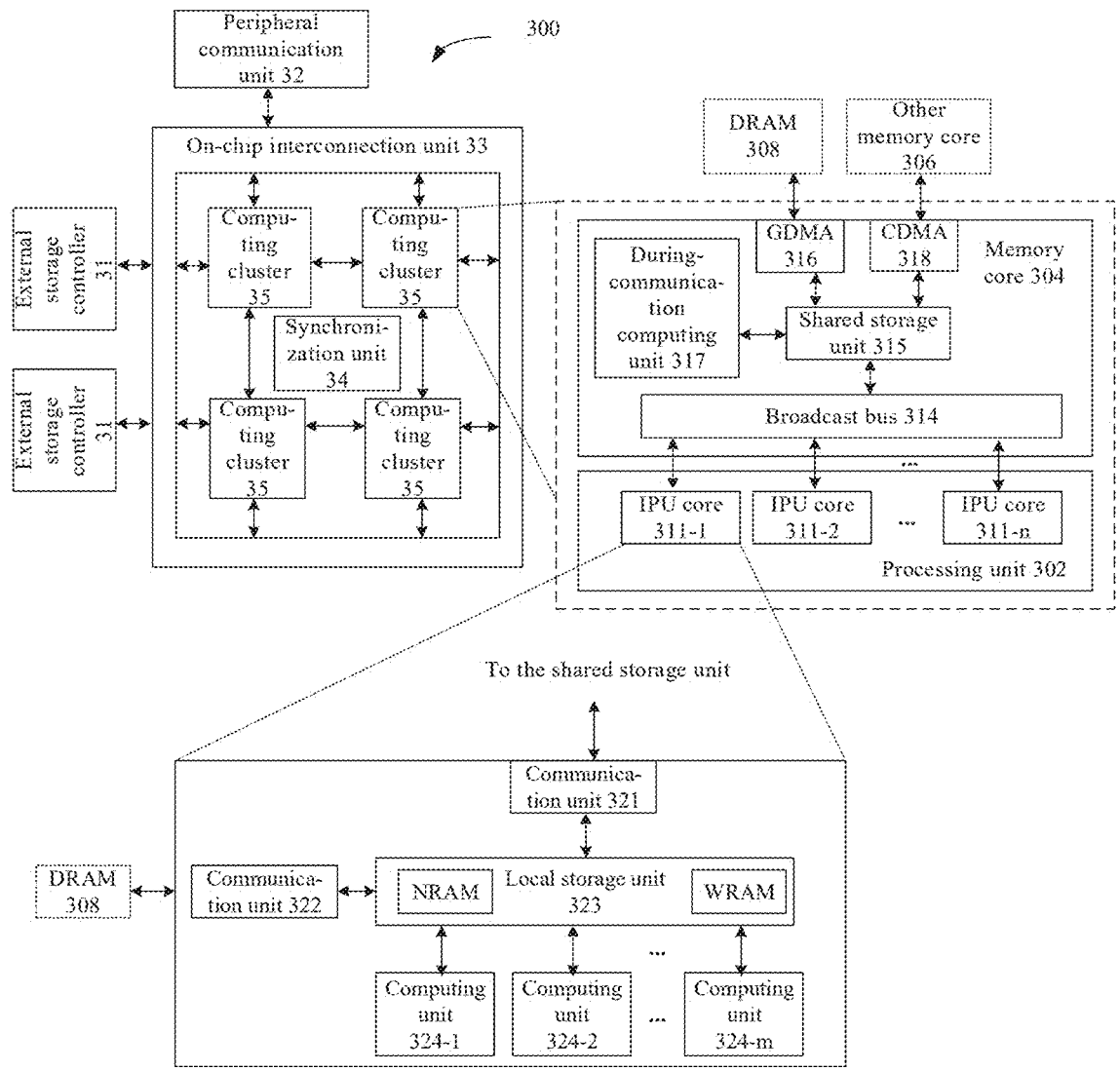
FIG. 3 is a schematic diagram of an internal structure of a multi-core computing apparatus according to an embodiment of the present disclosure.

FIG. 3 is a schematic diagram of an internal structure of a computing apparatus 201 with multiple cores. A multi-core computing apparatus 300 is designed in a hierarchical structure. The multi-core computing apparatus 300 serves as an on-chip system and includes at least one computing cluster, where each computing cluster further includes a plurality of IPU cores. In other words, the multi-core computing apparatus 300 is composed by a hierarchy of on-chip system-computing cluster-IPU core.

In terms of a hierarchy of the on-chip system, as shown in FIG. 3, the multi-core computing apparatus 300 includes an external storage controller 31, a peripheral communication unit 32, an on-chip interconnection unit 33, a synchronization unit 34, and a plurality of computing clusters 35.

There may be a plurality of external storage controllers 31, two of which are exemplified in the figure. The external storage controllers are configured to, in response to access requests from the IPU cores, access an external memory, such as the DRAM 204 in FIG. 2, to read or write data off-chip. The peripheral communication unit 32 is configured to receive a control signal from the processing apparatus 203 through the interface apparatus 202 to start the computing apparatus 201 to perform a task. The on-chip interconnection unit 33 connects the external storage controller 31, the peripheral communication unit 32, and the plurality of computing clusters 35 and is configured to transfer data and control signals among the units. The synchronization unit 34 is a GBC (global barrier controller) and is configured to coordinate a work progress of each computing cluster to ensure synchronization of information. The plurality of computing clusters 35 are computing cores of the multi-core computing apparatus 300, four of which are exemplified in the figure. With the development of hardware, the multi-core computing apparatus 300 of the present disclosure may further include 8, 16, 64, or even more computing clusters 35. The computing clusters 35 are configured to efficiently perform deep learning algorithms. The plurality of computing clusters 35 may form a grid structure for circular communication: in other words, there is a grid interconnection circuit between the plurality of computing clusters.

In terms of a hierarchy of the computing clusters, as shown in the upper right corner of FIG. 3, each computing cluster 35 includes a processing unit 302 and a MEM core (memory core) 304. The processing unit 302 performs various computing tasks. In some implementations, the processing unit may be a multi-core architecture, for example, including a plurality of IPU (intelligence processing unit) cores 311-1~311-n, so as to complete, for example, a large-scale vector computing task. The present disclosure does not limit the number of the IPU cores 311.

An internal architecture of the IPU core 311 is shown below FIG. 3. In each IPU core 311, there are a plurality of computing units 324-1~324-m configured to perform a computing task and a local storage unit 323 required for performing the computing task.

The computing units 324 are basic on-chip tensor computing units, which include, but are not limited to, vector operation units, tensor operation units configured to perform matrix multiplication, operation units configured to directly perform convolution operations, or convolution computing units that integrate img2col (image to column) and gemm (general matrix multiply).

A local storage unit 323 may be used as a cache level (such as an L1 cache (level 1 cache)) within the computing clusters 35, which may include an NRAM (neuron RAM (random access memory)) and a WRAM (weight RAM). The NRAM is configured to store input neuron, output neuron, and an intermediate result after computing. The WRAM is configured to store a convolution kernel of a deep learning network, which is a weight. It is required to be explained that the IPU core may further include various communication units to exchange data with an external storage units. For example, the local storage unit 323 may communicate with a shared storage unit 315 in the memory core 304 through a communication unit 321. The communication unit 321 may be, for example, an MVDMA (move direct memory access) unit. The local storage unit 323 may also exchange data with an off-chip memory, for example, a DRAM 308, through a communication unit 322. The communication unit 322 may be, for example, an IODMA (input/output direct memory access) unit. The IODMA 322 controls memory access between the NRAM/WRAM in the local storage unit 323 and the DRAM 308. The MVDMA 321 is configured to control memory access between the NRAM/WRAM in the local storage unit 323 and the shared storage unit 315.

Continuing with the upper right figure of FIG. 3, the memory core 304 is mainly used for storage and communication. In other words, the memory core 304 is mainly used for storing shared data or intermediate results between the IPU cores 311 and performing communication between the computing clusters 35 and the DRAM 308, communication between the computing clusters 35, and communication between the IPU cores 311. In other embodiments, the memory core 304 is capable of performing a scalar operation and is used for performing the scalar operation to realize operation tasks in data communication.

The memory core 304 includes a large SRAM (shared RAM) 315, a broadcast bus 314, a CDMA (computing cluster direct memory access) unit 318, and a GDMA (global direct memory access) unit 316, and a during-communication computing unit 317. The SRAM 315 plays the role of a high-performance data transfer station. Data reused among different IPU cores 311 in the same computing cluster 35 is not required to be acquired separately from the DRAM 308 through the IPU cores 311. Instead, the data is transferred among the IPU cores 311 through the SRAM 315. The memory core 304 is only required to quickly distribute the reused data from the SRAM 315 to the plurality of IPU cores 311, so as to improve inter-core communication efficiency and greatly reduce on-chip and off-chip input/output access.

The broadcast bus 314, the CDMA 318, and the GDMA 316 are configured to perform the communication between the IPU cores 311, the communication between the computing clusters 35, and data transfer between the computing clusters 35 and the DRAM 308, respectively. The above will be explained separately below.

The broadcast bus 314 is configured to complete high-speed communication between the IPU cores 311 in the computing clusters 35. The broadcast bus 314 of this embodiment supports inter-core communication modes, including unicast, multicast, and broadcast. The unicast refers to point-to-point (single IPU core-to-single IPU core) data transfer. The multicast refers to a communication mode in which a copy of data is transferred from the SRAM 315 to certain IPU cores 311. The broadcast refers to a communication mode in which a copy of data is transferred from the SRAM 315 to all IPU cores 311. The broadcast is a special case of the multicast.

Within each computing cluster 35, each IPU core 311 may initiate a broadcast to simultaneously broadcast data to a local storage unit 323 (such as NRAM or WRAM) of each core. Broadcasting the data to the NRAM and WRAM belongs to two data channels and may be performed concurrently, but at a certain time node, each IPU core may only initiate one broadcast; in other words, the broadcasts of the WRAM and NRAM may not be initiated in the same core at the same time.

The CDMA 318 is configured to control memory access of the SRAM 315 among different computing clusters 35 in the same computing apparatus 301. The GDMA 316 works with the external storage controller 31 to control memory access from the SRAM 315 to the DRAM 308 in the computing clusters 35 or read data from the DRAM 308 to the SRAM 315. It may be known from the above that communication between the DRAM 308 and the NRAM/WRAM in the local storage unit 323 may be implemented through two channels. A first channel is to directly contact the DRAM 308 with the local storage unit 323 through the IODMA 322. A second channel is to transfer the data between the DRAM 308 and the SRAM 315 through the GDMA 316 first, and then to transfer the data between the SRAM 315 and the local storage unit 323 through the MVDMA 321. Although it seems that the second channel requires more components and has long data flows, in fact, in some embodiments, the bandwidth of the second channel is much greater than that of the first channel. Therefore, the communication between the DRAM 308 and the local storage unit 323 may be more efficient through the second channel. Embodiments of the present disclosure may select a data transfer channel according to hardware conditions.

In some embodiments, the memory core 304 may be used as a cache level (such as an L2 cache (level 2 cache)) within the computing clusters 35 to broaden communication bandwidth. Further, the memory core 304 may also complete communication with other computing clusters 35. The memory core 304 may realize, for example, communication functions such as broadcast, scatter, gather, reduce, and all-reduce between the computing clusters 35. The broadcast refers to distributing and broadcasting the same data to all computing clusters. The scatter refers to distributing 30) different data to different computing clusters. The gather refers to gathering data of a plurality of computing clusters together. The reduce refers to sending a final result obtained by computing data of a plurality of computing clusters according to a specified mapping function to a certain computing cluster. The difference between the all-reduce and the reduce is that the final result of the latter is sent to only one computing cluster, while in the all-reduce, the final result is required to be sent to all computing clusters.

The during-communication computing unit 317 may be configured to complete computing tasks during the communication, such as the above-mentioned reduce and all-reduce, in the process of communication without the help of the processing unit 302, thereby improving communication efficiency and achieving the effect of "storage and computing in one unit". Depending on different hardware implementations, the during-communication computing unit 317 and the shared storage unit 315 may be integrated in the same or different components. This disclosed embodiment has no limitation on this respect, as long as functions and technical effects achieved are similar to those of this disclosure, the embodiments are within the scope of protection of this disclosure.

A DNN accelerator may be implemented as the computing apparatus 201 in FIG. 2. As can be seen from the internal structure of the computing apparatus 201 shown in FIG. 3, the DNN accelerator usually has a complex storage architecture, which is required to be explicitly managed by software. In addition, the accelerator uses VLIW (very long instruction word) to design its ISA (instruction set architecture) for vector or matrix operations. This kind of ISA is required to be scheduled by software at run time for better unit parallelism. Based on these characteristics, soft pipeline is one of the most efficient optimization methods for the DNN accelerator.

So far, the existing tools and systems are based on CPU or GPU without considering the architectural characteristics of the DNN accelerator. Due to completely different programming models, these existing schemes are not suitable for the DNN accelerator. Therefore, it is urgent to develop efficient architecture and system optimization schemes for a dynamic neural network in the DNN accelerator.

Exemplary Dynamic Pipeline System

A DNN tool supports a neural network that varies based on inputs and a dynamic declaration. Because of these dynamic characteristics, it is extremely challenging to implement efficient task scheduling and computing pipeline in a dynamic neural network.

Figures 4A, 4B:
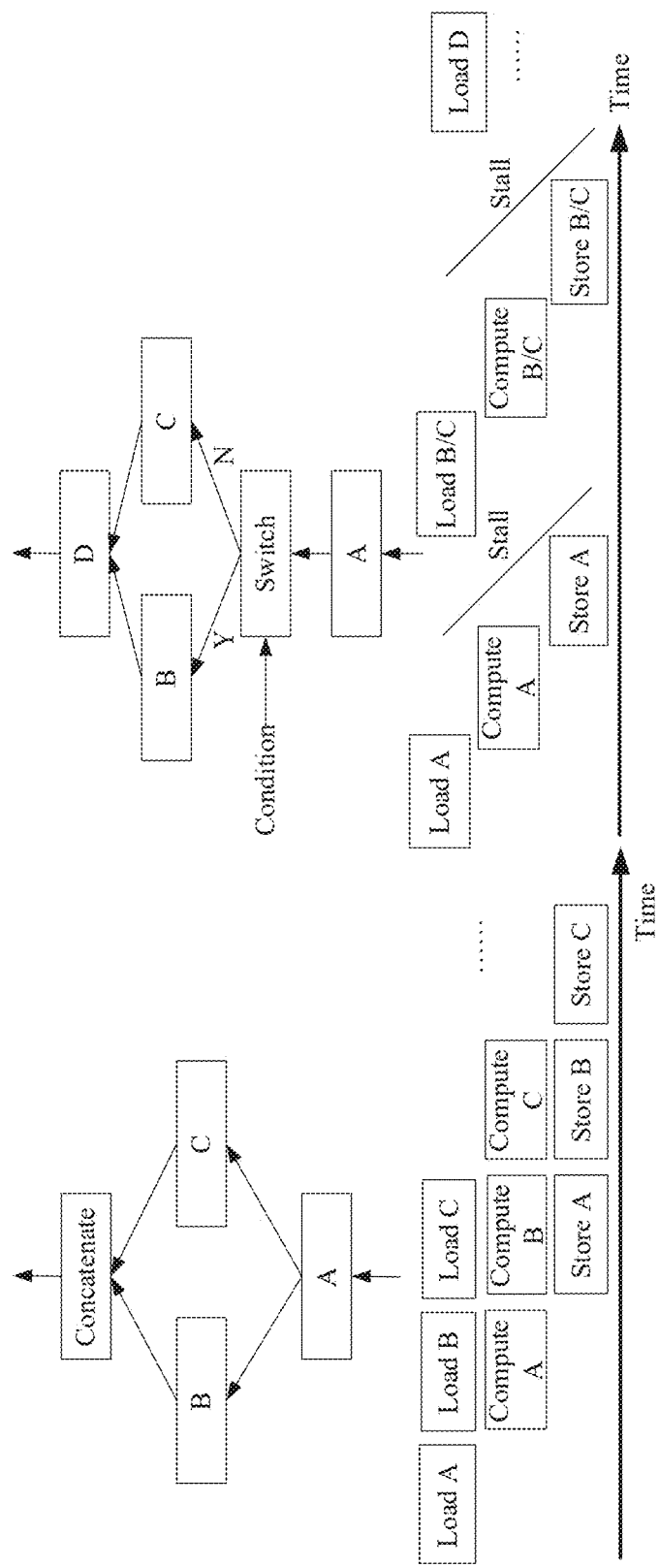
FIGS. 4A and 4B are an example of pipeline between nodes.

FIGS. 4A and 4B are an example of pipeline between nodes to illustrate challenges faced by a dynamic neural network. In this example, pipeline within the nodes is omitted. In the figure, FIG. 4A shows soft pipeline processing of a static neural network with a fixed structure, and FIG. 4B shows soft pipeline processing of a dynamic neural network with a control flow.

As shown in FIG. 4A, the static neural network usually adopts soft pipeline processing, which may perform computing and data transfer simultaneously to obtain better hardware utilization, thus improving computing parallelism. This soft pipeline is implemented by statically scheduling an execution sequence during compilation. When a structure of a neural network model is fixed, this kind of soft pipeline is simple and efficient.

However, for a dynamic neural network with a control flow, its scheduling sequence may not be determined in advance, so it is difficult to implement optimal static scheduling. As shown in FIG. 4B, in this computing graph, an execution of a node B or C depends on a result of conditional judgment. Therefore, it is not clear to determine whether the node B or C will be executed until run time. In this example, simple soft pipeline needs to insert a bubble, which causes pipeline stalls and prevents the improvement of computing parallelism.

In addition, the dynamic neural network is also more complex in terms of register management. Usually, for the static neural network, context information such as a tensor shape, a tensor address, and the number of cycles may be computed in advance as intermediate values. However, for the dynamic neural network, these pieces of information are variable values, and all pieces of context information are required to be saved in a register. This kind of requirement makes register allocation more challenging, especially for a processor with fewer registers or without a hardware memory management unit.

Based on this, in this disclosed embodiment, a dynamic pipeline scheme is provided, which may perform adjustment at compile stage and run time stage respectively to decouple a dynamic structure and scheduling from each other, thus eliminating inefficiency caused by dynamic characteristics in the dynamic neural network.

Figure 5:
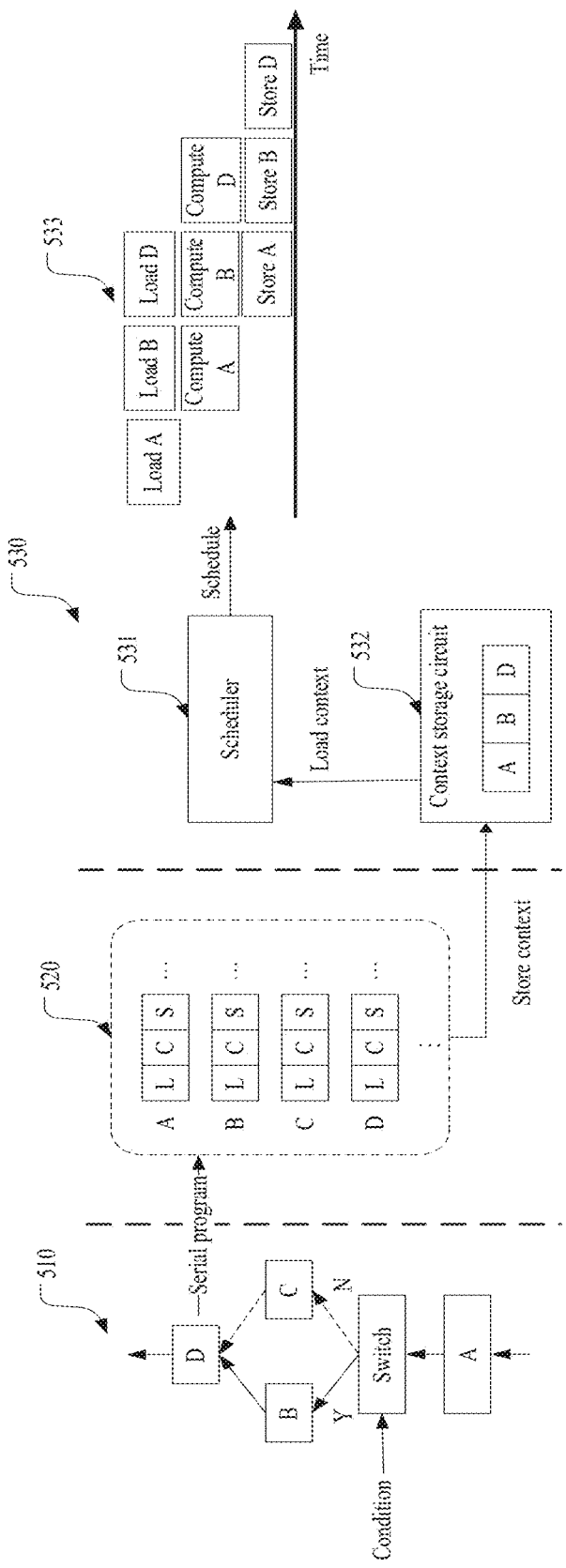
FIG. 5 is a schematic overview diagram of a dynamic pipeline system according to an embodiment of the present disclosure.

FIG. 5 is a schematic overview diagram of a dynamic pipeline system according to an embodiment of the present disclosure.

As shown in FIG. 5, a computing graph of a dynamic neural network in this example is shown as 510, where four nodes A, B, C, and D are shown, and a control flow (Switch) is included, which determines whether to execute the B or C at run time based on a conditional judgment.

During compilation, a compiler transforms a computing graph described in a high-level language into a series of low-level machine language instructions for a machine to execute. As shown by 520 in the figure, each node in the computing graph 510 is compiled into a machine instruction. Since dynamic characteristics may not be determined at this time, which means that it is not certain which node B or C will be executed, all nodes will be compiled. The figure shows the compilation of the nodes A, B, C, and D in serial order.

In this disclosed embodiment, in order to support pipeline processing at run time, each node is split into several execution blocks during compilation, where these execution blocks represent child operations of nodes in the computing graph. Further, these execution blocks are split according to whether hardware units involved in the nodes may be executed in parallel. For example, in the example shown in the figure, the node A is split into three execution blocks, including L (load), C (compute), and S (store), and the nodes B, C, and D are split similarly. It may be understood that a loading operation involves loading data from an external storage circuit to a local storage circuit; a computing operation involves a computing circuit; a storing operation involves storing a computing result back to an external storage circuit. It may be known from the storage architecture of the deep learning accelerator described above in combination with FIG. 3 that the parallel execution of the loading and storing operations may be supported through different access interfaces or allocation of different levels of storage circuits. Therefore, when the data processed is independent of each other, these three operations may be processed in parallel.

Then, when a compiled computing graph is run, when dynamic information such as a graph structure and a tensor shape is determined, execution blocks that are split during compilation may be used to construct a runtime computing graph. Since dynamic characteristics of a dynamic neural network, such as a tensor shape, an address, and a control flow; may be determined at run time, the constructed runtime computing graph is deterministic. In detail, as shown by 530, a context storage circuit 532 is introduced in the accelerator running the computing graph. The context storage circuit may be implemented by using a buffer, so the context storage circuit may also be called a context buffer (CB). The context storage circuit is configured to store information about an execution block that is required to be executed in the compiled computing graph at run time.

For example, in the example in the figure, assuming that by judging a condition of a control flow according to dynamic information at run time, the node B is determined to be executed, and then relevant information about each execution block in the nodes A, B, and D is stored to the context storage circuit. In this way, the dynamic pipeline system of this disclosed embodiment converts a dynamic graph into a deterministic graph stored in the context storage circuit.

Then, a scheduler 531 may be executed based on the deterministic graph constructed by the nodes A, B, and D, thereby implementing pipeline processing. As shown by 533 in the figure, the scheduler may implement parallel processing of three pipelines by scheduling. For example, at the same time, the D may be loaded, the B may be computed, and the A may be stored back. Thus, by scheduling these execution blocks that are determined to be executed in the context storage circuit 532, the scheduler may implement efficient pipelining without being affected by dynamic information.

As can be seen from the above description of the dynamic pipeline system, a first aspect of this disclosed embodiment provides an improved accelerator, which introduces a context storage circuit to maintain structural information of a runtime computing graph; a second aspect of this disclosed embodiment provides a compiler or programming interface, which splits a computing graph into several execution blocks during compilation, so as to construct a runtime computing graph in units of the execution blocks at run time; and a third aspect of this disclosed embodiment provides a scheduler, which schedules each operation based on a deterministic computing graph stored in a context storage circuit at run time, so as to implement parallel pipeline operations. Each aspect is described in detail below.

Exemplary Accelerator

FIG. 6 is a schematic simplified structure block diagram of an accelerator according to an embodiment of the present disclosure.

As shown in the figure, an accelerator 600 includes a parallel operation circuit 610, a context storage circuit 620, and a scheduling circuit 630. It may be understood that only components relevant to this embodiment are shown in the accelerator 600 of FIG. 6. Therefore, it is obvious to those skilled in the art that the accelerator 600 may further include common components that differ from those shown in FIG. 6, such as a control circuit.

The parallel operation circuit 610 is configured to perform operations in parallel. The parallel operation circuit, for example, may include a plurality of computing units capable of performing operations in parallel, including, but not limited to, a vector operation unit, a tensor operation unit configured to perform matrix multiplication, an operation unit configured to directly perform a convolution operation, or a convolution computing unit that integrates img2col (image to column) and gemm (general matrix multiply). The parallel operation circuit, for example, may be a computing unit 324 shown in FIG. 3.

The context storage circuit 620 is configured to store information about an execution block that is required to be executed in a compiled computing graph at run time. At run time, in response to the preparatory execution of the execution blocks, which execution blocks in the compiled computing graph will be executed is determined according to deterministic dynamic information, so that corresponding information about the execution blocks is stored to the context storage circuit 620.

The information about the execution blocks may include context information and a program counter (PC). The context information refers to all execution information of an operator, including, but not limited to, a data source address, a data destination address, a tensor data shape, and a computing configuration. For a convolution operator, the computing configuration, for example, involves a convolution parameter, such as a convolution kernel size parameter, a convolution stride, and convolution padding.

The PC is an identifier for each machine instruction that makes up a compiled computing graph, which points to a certain machine language instruction in a memory and an address containing that instruction. The context storage circuit maintains the information about the execution blocks based on the PC, thus facilitating subsequent scheduling of the execution blocks by the scheduling circuit 630.

In order to improve implementation efficiency, the context storage circuit 620 may be an on-chip storage circuit of the accelerator 600, especially a global cache circuit, which may provide greater storage space and lower access latency than the implementation using a register. The context storage circuit 620 may reduce the complexity of maintaining the context. During the optimization and execution of the dynamic neural network, a lot of context information is variable at run time. If a register is used, because of limited resources of the register, frequent register spill and refill operations are required to maintain this amount of context information. Register allocation is an NP (non-deterministic polynomial)-complete problem, and improper register allocation may block the pipeline. Therefore, compared with the limited resources of the register, the context storage circuit 620 provides larger and more adequate storage space for storing these contexts.

The context storage circuit 620 may be an additionally configured buffer or a storage area divided from an existing storage circuit on the accelerator 600, such as the shared storage unit 315 in FIG. 3, or the NRAM or WRAM in the local storage unit 323 in FIG. 3, which is not limited in this disclosed embodiment.

The scheduling circuit 630 is configured to schedule these execution blocks to be executed on the parallel operation circuit 610 based on a deterministic runtime computing graph constructed by the execution blocks stored in the context storage circuit 620 according to dependencies, so as to implement pipeline processing.

Specifically, the dependencies may include hardware unit dependencies and/or data dependencies. The hardware unit dependencies indicate whether a plurality of hardware units performing operations may be processed in parallel. For example, hardware units involved in the L (load), C (compute), and S (store) mentioned earlier may be processed in parallel. The data dependencies refer to whether read and write conflicts exist between data. For example, a second execution block needs to use an operation result of a first execution block, and the operation result of the first execution block needs to be written to a specified position before being read by the second execution block, so as to ensure correct running.

Therefore, in some embodiments, the scheduling circuit 630 determines execution blocks that may be executed in parallel within the same node and/or between different nodes of the runtime computing graph based on the hardware unit dependencies and/or data dependencies that execute each execution block, thus implementing pipeline processing based on these parallelisms.

As mentioned earlier, the context storage circuit 620 maintains the information about the execution blocks based on the PC. Therefore, during scheduling, the scheduling circuit 630 may call a corresponding execution block according to the PC stored in the context storage circuit 620. When executed, the called execution block loads corresponding context information from the context storage circuit 620 to execute a corresponding operation.

Therefore, based on the accelerator including the context storage circuit 620 provided in this disclosed embodiment, pipeline processing may be scheduled based on the constructed deterministic computing graph at run time, and hardware utilization and parallelism may be improved, thus improving operation efficiency.

Exemplary Compiler/Programming Interface

Pipeline scheduling requires distinguishing which execution blocks or codes may be executed in parallel on different hardware units, which is very time consuming at run time for a dynamic neural network. In order to overcome this problem, a dynamic pipeline system of this disclosed embodiment splits a node in a computing graph into several execution blocks during compilation, thus explicitly indicating a mapping relationship between hardware units and code segments to facilitate scheduling at run time.

FIG. 7 is an exemplary flowchart of a computing graph compiling method according to an embodiment of the present disclosure.

As shown in the figure, in a step 710, each node in a computing graph is split into several execution blocks to generate a compiled computing graph, where each execution block represents a child operation of a corresponding node. These split execution blocks may be used to construct and schedule a runtime computing graph in units of the execution blocks when the compiled compute graph is run.

In some embodiments, the splitting step 710 may include a following sub-step 711: splitting each node into several execution blocks according to whether a hardware unit involved is able to be executed in parallel.

Optionally or additionally, the splitting step 710 may further include a sub-step 712: dividing adjacent codes executed in the same hardware unit into the same execution block.

FIG. 8 is a computing graph splitting example according to an embodiment of the present disclosure.

As shown in the figure, depending on hardware units required for executing codes, nodes of the computing graph may be split into an L (load) execution block 810, a C (compute) execution block 820, and an S (store) execution block 830 accordingly.

Further, adjacent codes executed in the same hardware unit may be divided into the same execution block. In the example shown in the figure, three adjacent vector load instructions LoadV loading a bias, weight, and input respectively are executed by the same hardware unit, all of which load data from an off-chip storage circuit to an on-chip storage circuit, so all the three vector load instructions LoadV are divided into the L execution block 810. Three adjacent instructions executing convolution (Conv), vector addition (AddV), and activation (Active) respectively are all executed by a computing unit, so all the three adjacent instructions are divided into the C execution block 820. The S execution block 830 contains only one store instruction, which is used to store an operation result back to an off-chip storage circuit.

Through the splitting of the execution blocks, a scheduler at run time only needs to schedule different execution blocks, which greatly simplifies scheduling processing and reduces scheduling overhead at run time.

Additionally, in order to maintain context information about the execution blocks, an original program is required to be rewritten appropriately to preserve the context information at run time.

FIG. 9 is an exemplary rewriting program according to an embodiment of the present disclosure. This program shows preserving context information of an L execution block.

As shown in the figure, when the L execution block is ready, all variables involved are stored to a context storage circuit CB. These variables include, for example, a source address, a destination address, and a size of each piece of data. The source address is, for example, an address on an off-chip storage circuit DRAM, such as &in_ddr, &bias_ddr, and &weight_ddr in the program. The destination address is an address on an on-chip storage circuit, such as &in, &bias, and &weight in the program. The data size is, for example, in_size, bias_size, and weight_size in the program. Additionally, the program counter PC of the L execution block is also saved to the CB.

As can be seen from the above exemplary rewriting program, it is also possible to customize relevant information and/or a storage format of an execution block that is required to be stored in the context storage circuit at run time through a programming interface. As such, the context storage circuit may also be implemented more flexibly. No matter what form the information and/or storage format of the execution block is customized into, for example, no matter which parameters are stored specifically and what formats of the parameters are, the information and/or storage format of the execution block is only required to be consistent in storing and reading context information.

Additionally, the dynamic pipeline system of this disclosed embodiment also provides a programming interface to define each execution block, including defining a block name and execution action of the execution block.

FIG. 10 is an exemplary programming interface according to an embodiment of the present disclosure. This example shows a definition of an L execution block.

As shown in the figure, when the execution block is defined here, a keyword is added: a block name, which indicates a hardware unit involved in executing the execution block. In this example, the block name of the L execution block is IO, indicating that the L execution block involves an input and output hardware unit.

Additionally, the execution action or behavior of the execution block is also defined as first loading corresponding context information from the context storage circuit CB, and then executing an operation corresponding to the execution block based on the context information.

For example, in the example in the figure, first, context information, including a destination address (dst), a source address (src), and a data size (size), is read from the CB. Next, the action of the execution block is performed: in other words, data of a size indicated by the size is read from the address src of the off-chip storage circuit DRAM and is then stored in the address dst of the on-chip storage circuit.

It may be seen from the above that the compiler provided by this disclosed embodiment divides an operation program into two parts: one part is to maintain the context information and the PC, which facilitates the subsequent flexible call of the execution block; and the other part is to define different execution blocks and explicitly indicate block names of the execution blocks, which may indicate hardware unit dependencies between the execution blocks. Based on these presettings, the scheduler at run time may implement dynamic pipeline in units of execution blocks and with very little runtime overhead.

Exemplary Scheduling Process

FIG. 11 is an exemplary flowchart of a computing graph runtime scheduling method according to an embodiment of the present disclosure. As can be seen from the above description, based on the splitting of the computing graph during compilation and the additionally provided context storage circuit, even for a dynamic neural network, the accelerator may also implement pipeline processing at run time.

As shown in the figure, in a step 1110, information about an execution block that is required to be executed in a compiled computing graph is stored in response to the preparatory execution of the execution block in the compiled computing graph when the compiled computing graph is run, so as to construct a runtime computing graph.

When dynamic information such as a graph structure and a tensor shape in a dynamic neural network is determined, it is possible to determine which nodes in the compiled computing graph are required to be executed and which nodes are not required. At this point, information about an execution block of a node that is required to be executed may be stored in a specially provided context storage circuit. Thus, these stored execution blocks may constitute a deterministic runtime computing graph. The information about the stored execution block may include context information and a program counter, the details of which refer to the previous description and will not be repeated here.

Next, in a step 1120, the stored execution block is scheduled based on the deterministic runtime computing graph according to dependencies, so as to implement pipeline operations.

Specifically, execution blocks that may be executed in parallel within the same node and/or between different nodes of the runtime computing graph may be determined based on hardware unit dependencies and/or data dependencies for executing each execution block, thereby implementing pipeline processing by executing in parallel on different hardware units.

During scheduling, a corresponding execution block may be called according to the stored program counter. When executed, the called execution block, according to the definition (see the previous description of the compiler), loads corresponding context information from a context storage circuit first, and then performs a corresponding operation according to the context information.

FIGS. 12A to 12D are an exemplary execution process of a runtime scheduling scheme according to an embodiment of the present disclosure.

Figure 12A:
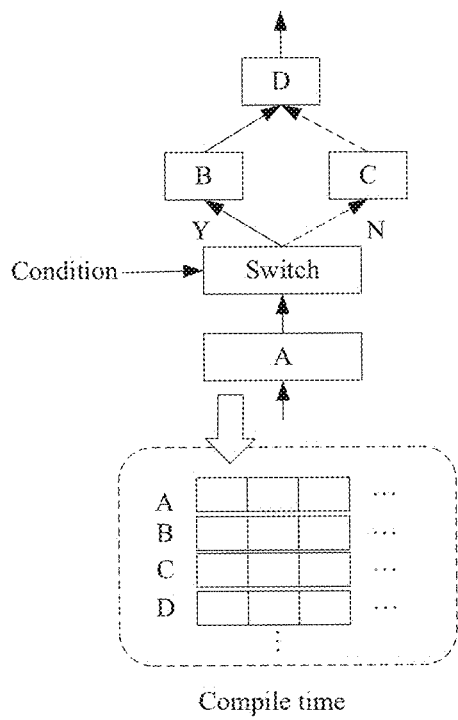

FIG. 12A shows that during compilation, all nodes of a dynamic computing graph containing a control flow are split into several execution blocks and a corresponding compiled computing graph is generated. Execution blocks of all relevant nodes are defined during compilation according to a programming interface. Execution blocks of nodes A, B, C, and D in the FIG. 12A are all predefined.

Figure 12B:
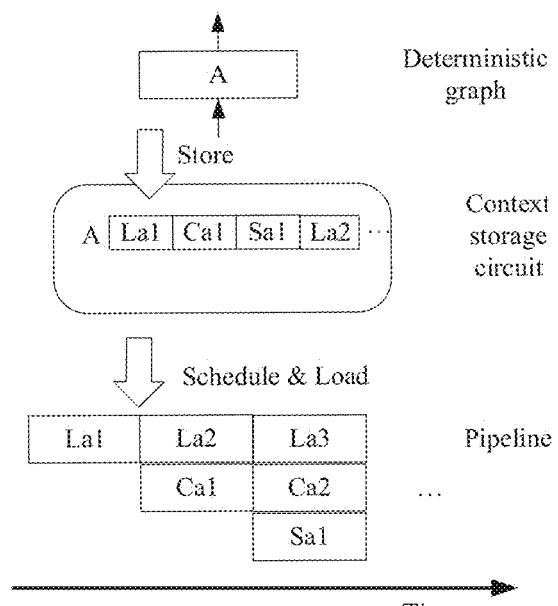

FIGS. 12B to 12D show dynamic scheduling processes at run time. At run time, according to determined dynamic information, only information about an execution block of a node that is required to be executed is saved to a context storage circuit CB. For example, when a condition of a control flow of the computing graph in the figure is judged to be true, the execution blocks of the nodes A, B, and D are stored in the CB. Thus, a deterministic runtime computing graph may be constructed in the CB.

Specifically, as shown in the FIG. 12B, information about each execution block of the node A that is determined to be executed is stored in the context storage circuit CB in response to the preparatory execution of the node A. In this example, the node A is split into L, C, and S execution blocks according to the hardware unit executed, and data is split according to a maximum processing capacity of hardware at one time, so that there may be a plurality of corresponding L, C, and S execution blocks. For example, when the data is split into a1, a2, and a3, there are corresponding execution blocks La1, Ca1, Sa1, La2, Ca2, Sa2, La3, Ca3, and Sa3. At this time, a scheduler may schedule execution blocks stored in the CB based on dependencies.

As shown in the FIG. 12C, information about each execution block of the node B that is determined to be executed is stored in the CB in response to the preparatory execution of the node B. In this example, the node B is also split into a plurality of L, C, and S execution blocks according to the hardware unit executed and the maximum processing capacity of hardware at one time. For example, the node is split into execution blocks Lb1, Cb1, Sb1, Lb2, Cb2, Sb2, and Lb3. At this time, the scheduler may schedule the execution blocks stored in the CB based on the dependencies.

The process in the FIG. 12D is similar to the previous one and will not be detailed here.

In specific scheduling, scheduling within the same node and/or between different nodes may be involved. Taking in FIG. 12B as an example, scheduling within the node A is involved. In the figure, Lai represents a loading execution block of the node A for an i-th data block, and Cai represents a computing execution block of the node A for the i-th data block. Due to hardware unit dependencies, La2 should be executed after La1 because both involve the same hardware unit. Moreover, Ca1 should also be executed after La1 due to data dependencies. However, La2 and Ca1 may be executed in parallel. Therefore, in the FIG. 12B, La2 and Ca1 may be scheduled and executed simultaneously.

In FIG. 12C, shows scheduling between different nodes. When the node B is ready, execution blocks of the node B are also stored in the CB. At the same time, there are the remaining unprocessed execution blocks of the node A in the CB, including San-1, Can, and San. In this scenario, the scheduler may call Lb1, San-1, and Can to be executed in parallel.

Thus, the dynamic pipeline system provided by this disclosed embodiment eliminates the need to add redundant bubbles to interrupt the pipeline and thus enables efficient pipeline processing.

The dynamic pipeline scheme of this disclosed embodiment is described above in combination with various drawings. Experimental results show that the dynamic pipeline scheme of this disclosed embodiment may achieve significant performance improvement on a dynamic neural network. For example, with the dynamic pipeline scheme of this disclosed embodiment, 1.7 times speed improvement on the dynamic neural network may be achieved. In addition, the experimental results also show that the dynamic pipeline scheme of this disclosed embodiment may also be applied to a static neural network, where the overhead introduced by the context storage circuit is almost negligible. For example, the dynamic pipeline scheme of this disclosed embodiment may maintain over 96% of performance on the static neural network. Therefore, the dynamic pipeline scheme of this disclosed embodiment may be applied not only to the dynamic neural network, but also to the static neural network, and may also be applied to a mixed scenario where both the dynamic and static neural networks exist. The previous description taking the dynamic neural network as an example is also applicable to the static neural network or the mixed scenario.

Some embodiments of the present disclosure also provide a chip and board card containing the above accelerator and/or compiler, which may contain corresponding features described above and will not be repeated here.

According to different application scenarios, an electronic device or apparatus of the present disclosure may include a server, a cloud server, a server computing cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph. The electronic device or apparatus of the present disclosure may be further applied to Internet, Internet of Things, data center, energy, transportation, public management, manufacturing, education, power grid, telecommunications, finance, retail, construction sites, medical, and other fields. Further, the electronic device or apparatus of the present disclosure may be further used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with that of the terminal device and/or the edge device. As such, according to the hardware information of the terminal device and/or the edge device, appropriate hardware resources may be matched from hardware resources of the cloud device to simulate hardware resources of the terminal device and/or the edge device to complete unified management, scheduling, and collaborative work of terminal-cloud integration or cloud-edge-terminal integration.

It is required to be explained that, for the sake of brevity, the present disclosure describes some method embodiments as a series of actions and combinations thereof, but those skilled in the art may understand that the solution of the present disclosure is not limited by an order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as optional embodiments; in other words, actions and units involved thereof are not necessarily required for the implementation of a certain solution or some solutions of the present disclosure. Additionally, according to different solutions, descriptions of some embodiments of the present disclosure have their own emphases. In view of this, those skilled in the art may understand that, for a part that is not described in detail in a certain embodiment of the present disclosure, reference may be made to related descriptions in other embodiments.

In terms of specific implementations, according to the present disclosure and under the teaching of the present disclosure, those skilled in the art may understand that several embodiments disclosed in the present disclosure may be implemented in other ways that are not disclosed in the present disclosure. For example, for units in the aforementioned electronic device or apparatus embodiment, the present disclosure divides the units on the basis of considering logical functions, but there may be other division methods during actual implementations. For another example, a plurality of units or components may be combined or integrated into another system, or some features or functions in the units or components may be selectively disabled. In terms of a connection between different units or components, the connection discussed above in combination with drawings may bedirect or indirect coupling between the units or components. In some scenarios, the direct or indirect coupling relates to a communication connection using an interface, where the communication interface may support electrical, optical, acoustic, magnetic, or other forms of signal transmission.

In the present disclosure, units described as separate components may be or may not be physically separated. Components shown as units may be or may not be physical units. The components or units may be located in a same position or distributed to a plurality of network units. Additionally, according to actual requirements, some or all of the units may be selected for achieving the purpose of the solution described in the embodiments of the present disclosure. Additionally, in some scenarios, the plurality of units in the embodiments of the present disclosure may be integrated into one unit, or each of the units may be physically separated.

In some other implementation scenarios, the integrated unit may be implemented in the form of hardware. The hardware may be a specific hardware circuit, which may include a digital circuit and/or an analog circuit, and the like. A physical implementation of a hardware structure of the circuit includes but is not limited to a physical component. The physical component includes but is not limited to a transistor, or a memristor, and the like. In view of this, various apparatuses (such as the computing apparatus or other processing apparatus) described in the present disclosure may be implemented by an appropriate hardware processor, such as a CPU, a GPU, an FPGA, a DSP, and an ASIC, and the like. Further, the storage unit or the storage apparatus may be any appropriate storage medium (including a magnetic storage medium or a magneto-optical storage medium, and the like), such as an RRAM (resistive random access memory), a DRAM (dynamic random access memory), an SRAM (static random access memory), an EDRAM (enhanced dynamic random access memory), an HBM (high bandwidth memory), an HMC (hybrid memory cube), an ROM (read only memory), and an RAM (random access memory), and the like.

The embodiments of the present disclosure have been described in detail above. The present disclosure explains principles and implementations of the present disclosure with specific examples. Descriptions of the embodiments above are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

What is claimed is:

1. A computing graph runtime scheduling method, wherein a computing graph is a compiled computing graph, and the compiled computing graph comprises a plurality of execution blocks, the execution blocks represent child operations of each node in the computing graph, the method comprising:
    storing information about an execution block that is required to be executed in the compiled computing graph in response to the preparatory execution of the execution block when the compiled computing graph is run, so as to construct a runtime computing graph; and
    scheduling the stored execution block based on the runtime computing graph according to dependencies, so as to implement pipeline operations.

2. The method of claim 1, wherein the scheduling comprises:
    determining execution blocks that are able to be executed in parallel within the same node and/or between different nodes of the runtime computing graph based on hardware unit dependencies and/or data dependencies for executing the execution block.

3. The method of claim 1, wherein the storing comprises:
    storing context information and a program counter of the execution block that is required to be executed.

4. The method of claim 3, wherein the context information comprises at least one of followings: a data source address, a data destination address, a tensor data shape, and a computing configuration.

5. The method of claim 3, wherein the scheduling comprises:
    calling a corresponding execution block according to the stored program counter.

6. The method of claim 5, further comprising:
    loading the stored context information to perform a corresponding operation when the called execution block is executed.

7. The method claim 1, wherein each node in the compiled computing graph is split into several execution blocks during compilation in a following manner:
    splitting each node according to whether a hardware unit involved is able to be executed in parallel.

8. The method of claim 7, wherein each node in the compiled computing graph is further split into several execution blocks during compilation in a following manner:
    dividing adjacent codes executed in the same hardware unit into the same execution block.

9. The method of claim 1, wherein each execution block has a block name, wherein the block name is used to indicate a hardware unit involved in executing a current execution block to indicate hardware unit dependencies at scheduling.

10. The method of claim 1, wherein the compiled computing graph is a dynamic computing graph, and the runtime computing graph is a deterministic computing graph.

11. An accelerator comprising:
    a parallel operation circuit configured to perform operations in parallel;
    a context storage circuit configured to store information about an execution block that is required to be executed in a compiled computing graph in response to the preparatory execution of the execution block when the compiled computing graph is run, so as to construct a runtime computing graph, wherein the compiled computing graph comprises a plurality of execution blocks, wherein the execution blocks represent child operations of each node in the computing graph; and
    a scheduling circuit configured to schedule the stored execution block based on the runtime computing graph according to dependencies to control the parallel operation circuit to implement pipeline operations.

12. The accelerator of claim 11, wherein the information about the execution block comprises context information and a program counter.

13. The accelerator of claim 12, wherein the context information comprises at least one of followings: a data source address, a data destination address, a tensor data shape, and a computing configuration.

14. The accelerator of claim 11, wherein the scheduling circuit is further configured to:
  determine execution blocks that are able to be executed in parallel within the same node and/or between different nodes of the runtime computing graph based on hardware unit dependencies and/or data dependencies for executing the execution block.

15. The accelerator of claim 12, wherein the scheduling circuit is further configured to:
  call a corresponding execution block according to the stored program counter.

16. The accelerator of claim 15, wherein when executed, the called execution block loads the corresponding context information from the context storage circuit to perform a corresponding operation.

17. The accelerator of claim 11, wherein each node in the compiled computing graph is split into several execution blocks during compilation in a following manner:
  splitting each node according to whether a hardware unit involved is able to be executed in parallel.

18. The accelerator of claim 17, wherein each node in the compiled computing graph is further split into several execution blocks during compilation in a following manner:
  dividing adjacent codes executed in the same hardware unit into the same execution block.

19. The accelerator of claim 11, wherein each execution block has a block name, wherein the block name is used to indicate a hardware unit involved in executing a current execution block to indicate hardware unit dependencies to the scheduling circuit.

20. The accelerator of claim 11, wherein the context storage circuit is an on-chip storage circuit of the accelerator.

* * * * *